Sept. 8, 1970  E. D. HINDENBURG  3,528,050
PUSH-ON TYPE GROUNDING CLIP
Filed May 2, 1969  3 Sheets-Sheet 1
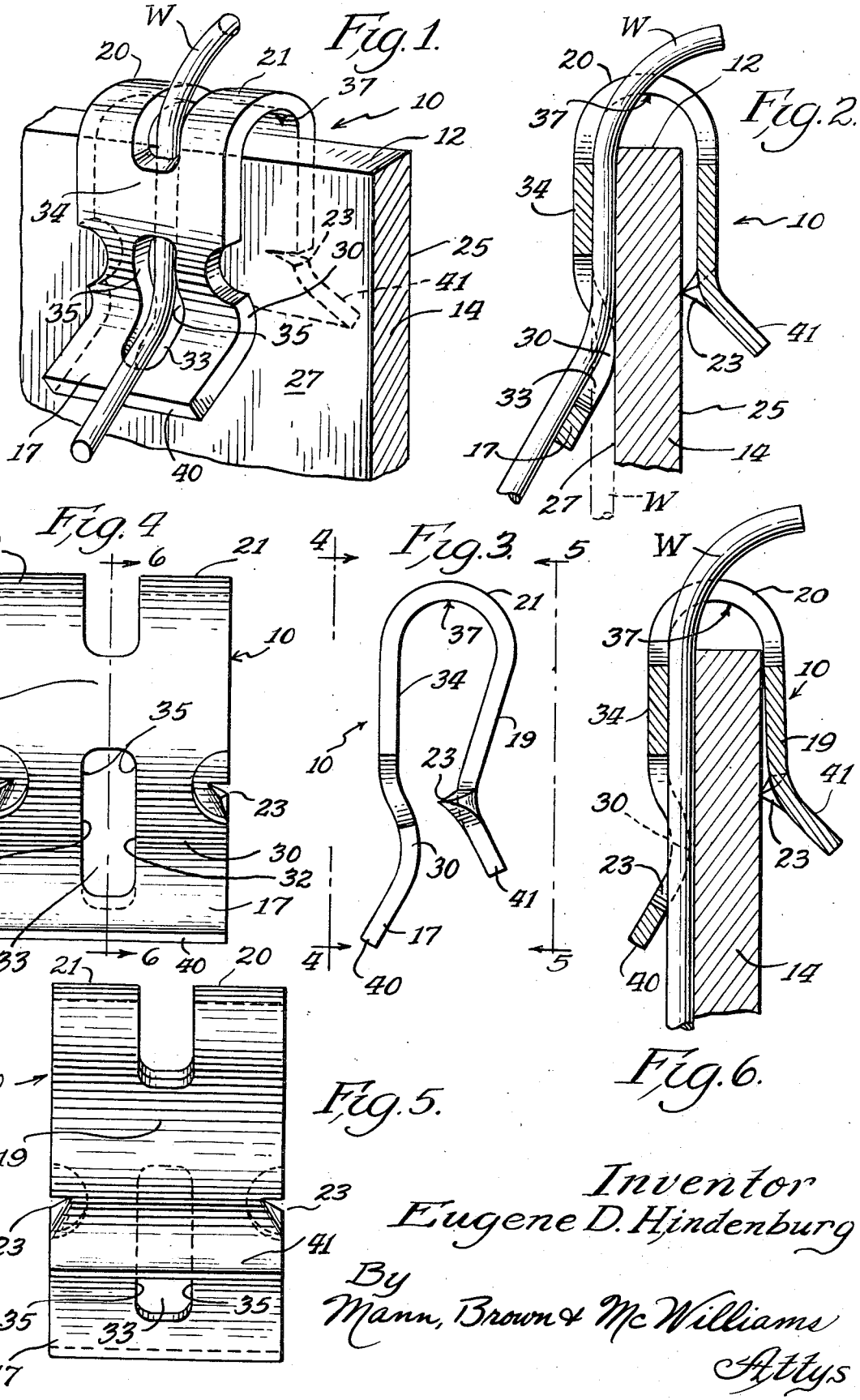
Inventor
Eugene D. Hindenburg
By
Mann, Brown & McWilliams
Attys Sept. 8, 1970  E. D. HINDENBURG  3,528,050
PUSH-ON TYPE GROUNDING CLIP Filed May 2, 1969  3 Sheets-Sheet 2

Inventor
Eugene D. Hindenburg
By Mann, Brown and McWilliams
Attys.

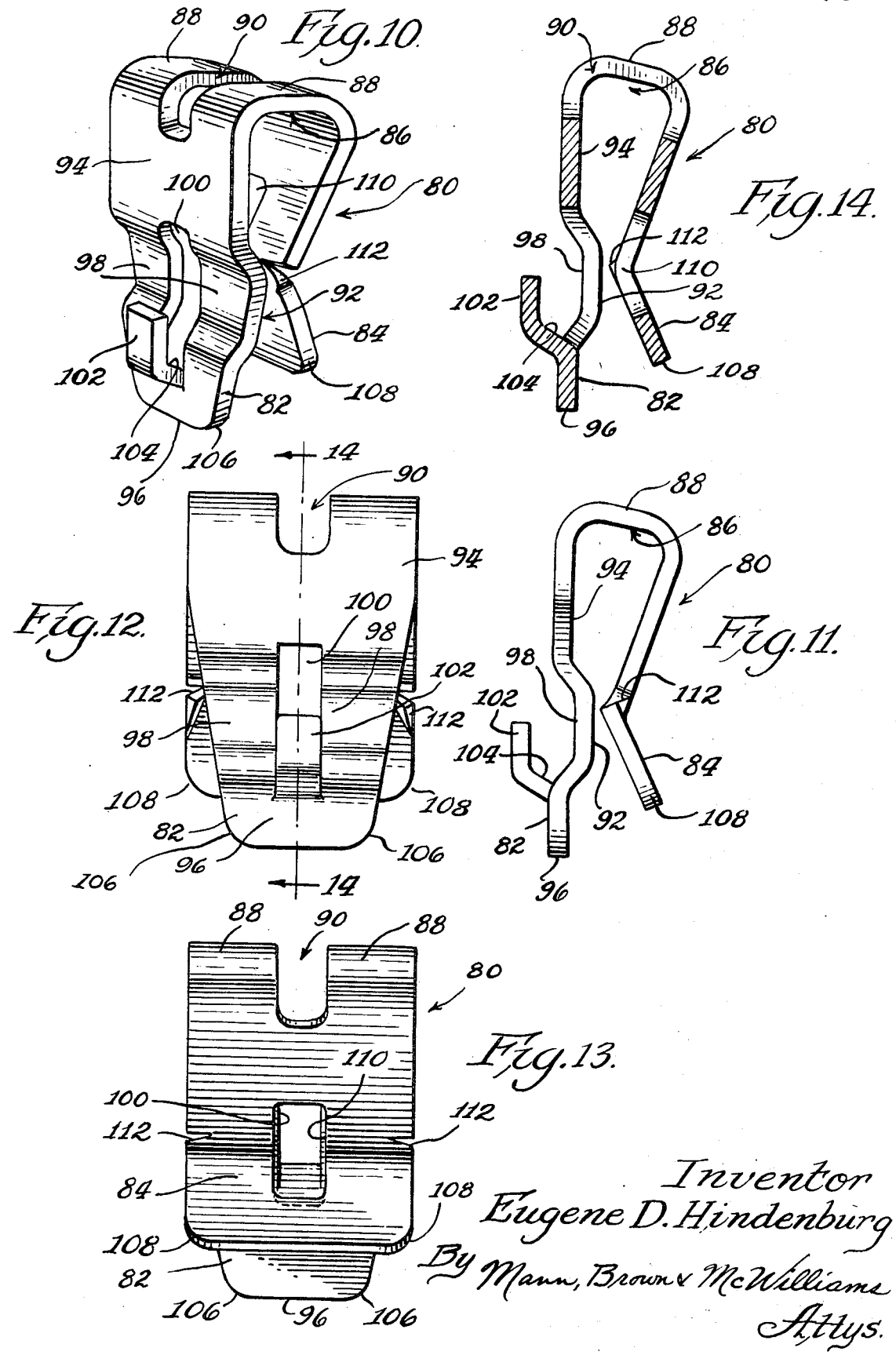

United States Patent Office 3,528,050
Patented Sept. 8, 1970

3,528,050
PUSH-ON TYPE GROUNDING CLIP
Eugene D. Hindenburg, Sycamore, Ill., assignor to Holub Industries, Inc., a corporation of Illinois
Continuation-in-part of application Ser. No. 666,093, Sept. 7, 1967. This application May 2, 1969, Ser. No. 825,112
Int. Cl. H01r 11/20
U.S. Cl. 339—95
20 Claims

ABSTRACT OF THE DISCLOSURE

The present invention relates to apparatus for securing a wire, conduit or the like to a wall, and more particularly to an electrical outlet box or the like. Specifically, there is disclosed an improved press-on type clip having utility in bringing about pressure contact between a ground wire and an associated metallic box or electrical housing.

The clip of the present invention comprises a unitary piece of spring material which is formed into a generally horseshoe-shaped device capable of being pressed over an edge of an appropriate housing and being configured to receive a grounding wire, conduit or the like and press the same into conductive contact with the housing wall.

CROSS-REFERENCE

This application is a continuation-in-part of U.S. application Ser. No. 666,093 filed Sept. 7, 1967, and now abandoned.

FIELD OF THE INVENTION

The clip of the present invention was constructed to have particular, although not exclusive, utility in providing electrically conductive contact between a ground wire and a housing or outlet box. It has been common practice in both commercial and residential installations to ground the shroud or cable surrounding an electrical line to the outlet box into which that line is run. This is accomplished by providing an electrically conductive connection between the BX cable, pipe, or other conduit material and the outlet box which is typically metal and is itself grounded.

THE PRIOR ART

A wide variety of arrangements has been provided for clamping the ground wire to the outlet box. Among the more common are those which provide a post or screw in the outlet box about which a ground wire may be wrapped.

With the view toward simplifying the grounding procedure, press-on clips have been developed which are constructed to engage the side wall of an outlet box and clamp the grounding wire to the wall at the same time. Examples of prior art clips are disclosed in Cook et al. 3,021,581 and 3,122,604. It is to improvements in this particular type of clip arrangement that the present invention is directed.

SUMMARY OF INVENTION

The clip of the present invention, not unlike competitive clips now in use, is constructed to be pressed over the edge of one of the walls of an electrical outlet box. The present clip provides certain specific advantages, however, in the manner in which the grounding wire is secured between the clip and against the wall of the outlet box and the manner of mounting the clip on the wall of the electrical outlet box. More particularly, a positive contact is provided to insure against inadvertent displacement of the wire from the influence of the clip which might result through vibration or other causes. Additionally, specific tool engaging means is provided in one embodiment, to facilitate mounting of the clip. Moreover, the overall clip construction is simplified to an extent which greatly enhances its manufacture and use by the person installing the same.

Still other advantages may be found in the manner in which the clip is constructed to accommodate a wide range of wire sizes, including conductor sizes which are adequate to meet the specifications for aluminum wire. The present invention provides effective pressure contact between the wire and the outlet box over a substantial length of the wire disposed beneath the clip, with an acceptable range of wire diameters.

THE DRAWINGS

FIG. 1 is a perspective of a clip constructed in accordance with the present invention, illustrating the manner in which a ground wire is secured to the wall of a conventional electrical housing;

FIG. 2 is an end view of FIG. 1 with the clip of the invention, sectioned to illustrate the manner in which the clip accepts a single diameter wire, clamping the same to the housing wall;

FIG. 3 is a view of the clip of the invention shown in its unmounted form, and illustrating its unstressed profile;

FIG. 4 is a side elevation viewed along lines 4—4 of FIG. 3, and illustrating details of construction of the inner leg of the clip of FIG. 3;

FIG. 5 is a view of FIG. 3 viewed along lines 5—5, and particularly illustrating detail of construction of the outer leg of the clip of FIG. 3;

FIG. 6 is a view similar to FIG. 2, but illustrating the manner in which the clip accommodates a large diameter wire;

FIG. 8 illustrates the clip of FIG. 7 in its mounted position as employed with the wall of an outer box or the like;

FIG. 10 is a perspective view of another embodiment of the clip of this invention;

FIG. 11 is a side view of the clip illustrated in FIG. 10;

FIG. 12 is a front view of the clip illustrated in FIG. 10;

FIG. 13 is a back view of the clip illustrated in FIG. 10; and

FIG. 14 is a view taken along the lines 14—14 of FIG. 12.

Figure 7:
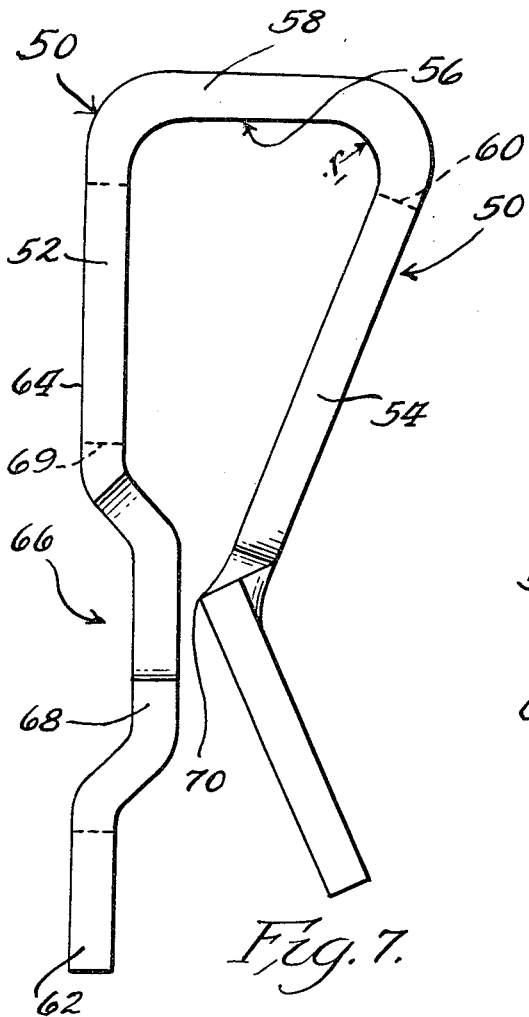
FIG. 7 is a view of a modified form of the clip of the present invention shown in a manner which illustrates its free or unstressed profile.

Referring now to the drawing, and in particular, FIG. 1 thereof, a saddle-type clip indicated at 10 and constructed in accordance with the present invention is shown in its mounted position. The clip straddles and embraces the top edge 12 of a wall 14 of the conventional electrical housing. It will be appreciated that the wall 14 is illustrative of a metal wall of any of the many structures adopted to house or otherwise contain electrical equipment. In the usual case, such housings are of metallic construction, and are grounded either by the use of cables or through some other electrically conductive device to a suitable ground. Accordingly, such housings serve as a convenient vehicle for grounding incoming electrical conductors. It will also be understood that while the present invention is illustrated in terms of its utility in grounding electrical wires, other uses are contemplated without departure from the invention.

FIG. 3, which illustrates the profile of the clip in its relaxed state, demonstrates the various structural advantages to be achieved by the invention. The clip is readily formed from a single strip of material such as spring steel into a U-shape or horseshoe profile. The inner and outer leg portions bear the identifying characters 17 and 19 respectively and are joined by contiguous span members 20 and 21 (see FIG. 4). The spans, as will be appreciated from the drawings, are readily formed by cutting a portion of the originally uniform strip from the center, thereby defining the span portions which then act as a pair of springs which resist efforts to displace the leg portions 17 and 19 relative to one another, and particularly any effort to spread them.

It is the purpose of the clip of the present invention to hold or otherwise secure a wire, such as ground wire W, in electrically conductive contact against a surface, such as surface 27 of the wall 14. Code specifications have been formulated which determine the maximum allowable electrical resistance between the surface of the wire and the surface to which it is grounded. The clip of the present invention accomplishes sufficient clamping to assure maximum possible contact between the wire surface and the wall to which the wire is clamped, thereby providing more than ample safety in meeting the specifications provided for clips of this type.

In the practice of the invention, the wire W is threaded or sandwiched between the inner leg 17 of the clip and the face 27 of the wall engaged thereby. The spreading of the legs 17 and 19 of the clip to accommodate the wire diameter, is resisted by the bias of the spans, and results in an inwardly directed uniform pressure being applied to the length of wire beneath the clip so as to bring it into proper surface contact with the wall.

One of the difficulties experienced in the use of clips of the type to which the present invention applies is the maintenance of contact of the essentially round, smooth surfaced conductor or wire W in the face of vibration or other upsetting influences. This problem is accentuated in the use of the lower gauge, larger diameter wire which tends to "roll" or otherwise move about beneath the clip.

In order to insure permanence and stability of the installation, within a wide range of useable wire gauges, provision is made in the leg 17 for securing the wire W not only in clamping pressure contact with the wall surface 27, but also against inadvertent lateral movement from its mounted position, which movement might tend to upset the conductive engagement between the wire and the grounding surface. To this end, the leg 17 is provided with an inwardly directed ridge or protuberance 30. The ridge or protuberance 30, which is transverse to the leg, is slotted to provide an opening 33, approximately centered on the leg 17, the slot being elongated in the longitudinal axis of the leg. It will be noted in this instance, that ridge or protuberance 30 is curvilinear in profile or cross-section.

Referring again to FIG. 3, in order to facilitate the mounting of the clip to the wall 14, the free ends 40 and 41 of the legs 17 and 19 respectively, are flared outwardly. The ridge or protuberance 30, which is divided into parallel wire confining sections 32 by the slot 33, defines therewith a path of sufficient depth through which the wire W may be secured against lateral movement from under the influence of the leg of the clip.

The slot 33 is centered between the sides of the leg and elongated, extending from a lower extremity below the ridge or protuberance 30 in the leg, and well into the flared end 40 to an upper extremity shy of the spans 20 and 21 (FIGS. 1 and 4). In order to avoid bending of the wire, it is preferred that the slot be formed to be aligned with the space between the spans 20 and 21 which hold the legs of the clip in resilient juxtaposition. A bridge 34 is thus formed between the slot and the space between the spans. It will be appreciated that the width of the slot may be suitably larger than the diameter of the largest wire or wires anticipated to be used for this purpose.

Accordingly, in the practice of the invention, the wire is threaded vertically upward (as seen in FIG. 1) so that a portion thereof is confined between the bridge 34 of the inner leg 17 of the clip, and the face 27 of the wall to which the clip is mounted. The free end of the wire is extended between the spans 20 and 21 where it may be readily viewed by an inspector, and eventually clipped so as to not interfere with the placement of a cover on the housing. With the wire thus positioned, the clip is readily pressed over the edge of the wall 12.

The bridge 34, in keeping with one aspect of the invention, is pre-formed to provide a pressure surface which remains substantially parallel with the face 27 of the wall in order that a uniform constant clamping pressure is applied to the wire sandwiched between the bridge and the wall. This is accomplished in the formation of the clip in two ways; first, the length of the spans is formed so as to be greater than the combined thickness of the wall and wire by a predetermined amount. Thus, as the clip is spread by the wire, the bearing surface of the bridge is able to engage the wire W over the entire length thereof and, because of the resiliency of the clip, clamp the same with a uniform and substantial force over the engaged length to the face of the wall to provide maximum contact therewith. A second structural feature, and one which lends additional versatility to the present clip by making it capable of use with a range of widely used wire sizes, is the provision of strategically placed barbs or spurs 23, which are formed on the outer leg 19. These barbs or spurs are directed inwardly, and present a sharp corner to the outer surface 25 of the wall 14. The sharp corners are directed generally upwardly and inwardly, and thus by the nature of their formation, yield to the downward pressure of the clip being pressed onto the wall. However, should effort be made to push the clip upwardly from its mounted position on the wall, the spurs will tend to dig into the surface 25 of the wall to resist such removal. As a result, the clip will be effectively destroyed by any effort to remove it from its mounted position and it would be necessary for a new clip to be used. This provides an additional safety factor in that the user will always be assured of having the maximum contact pressure for which the particular clip was designed.

An important aspect of the provision of spurs is their use as parallel fulcrums about which the clip is permitted limited pivotal movement to effect a uniform distribution of pressure over the length of wire pinched between the bridge 34 and the wall 27, irrespective of the wire diameter.

It is evident that the length of the spans must, as a practical matter, be a compromise between the various wire diameters which, it is anticipated, will be encountered in use. By using the barbs as pivot points, however, the clip position will automatically adjust to the wire diameter, and contact between the bridge and wire will be maintained over the entire length of the bridge. This phenomenon may be observed by comparing the clip position in FIGS. 2 and 6, where the accommodation to wire size, made by the clip of the invention, is plainly shown.

It will also be observed (FIG. 1) that the wire may be so positioned that a portion thereof is confined between the side walls 35 of the slot 33, whether or not it is threaded through the clip (FIG. 2) or under the ridge or protuberance 30, as the alternative showing of FIG. 6 suggests. Thus, little or no chance is available for the wire to be displaced, pulled, or othewise dislodged from its position of engagement with the wall 14.

Alluding briefly to the actual installation of the device, an added advantage of this construction is the provision of alternate means of threading the wire with respect to the clip. Thus, as seen in FIG. 2, alternative methods of threading the wire are illustrated; one, in solid lines wherein the wire extends from a point outside the clip leg 17, through the slot 33, where it is positively restrained from lateral displacement, and the end passed through the space between the spans 20 and 21; and secondly, the wire may be threaded between the free end 40 of the leg 17 and because the slot traverses the ridge or protuberance 30, the wire is, in keeping with the invention, secured against lateral movement or displacement by the edges of the slot 35 while being threaded in the usual manner past the bridge 34 and between the spans 20 and 21. Accordingly, the user is able to accomplish the desired result by using either mode of placement of the ground wire. In either case, maximum contact is provided between the bridge 34 and the wire W which brings about optimum electrical contact between the wire and the wall 14.

Figure 8:
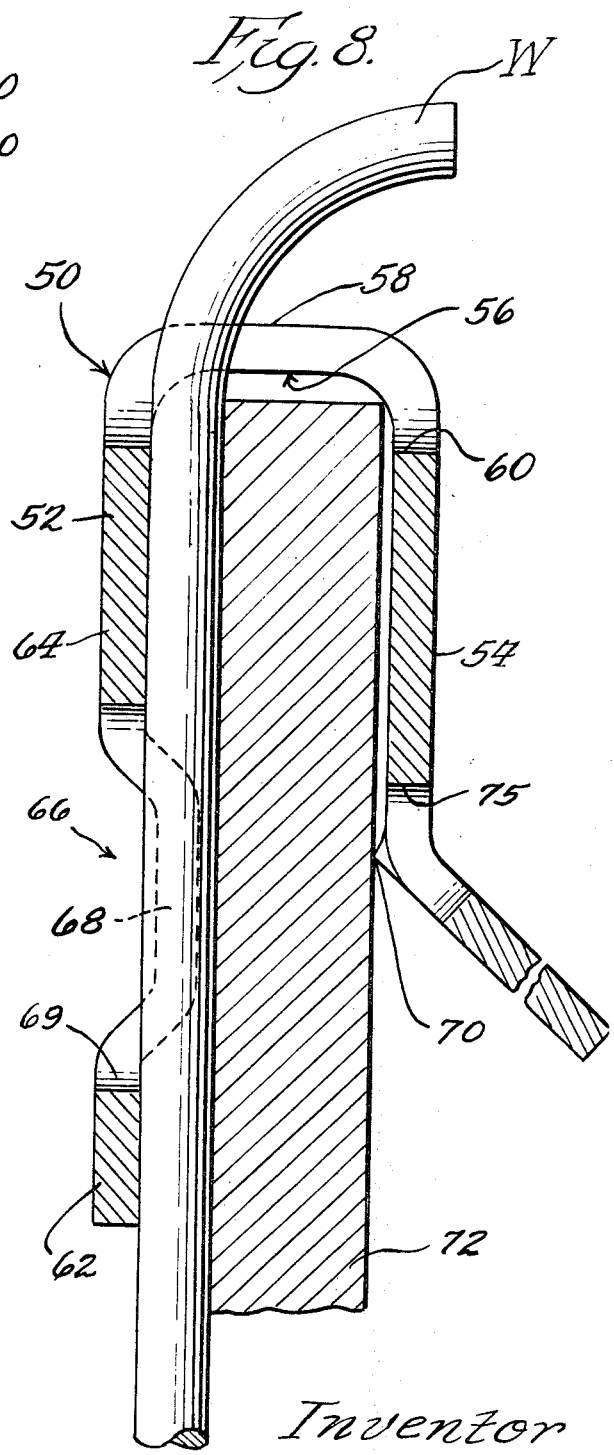
Figure 9:
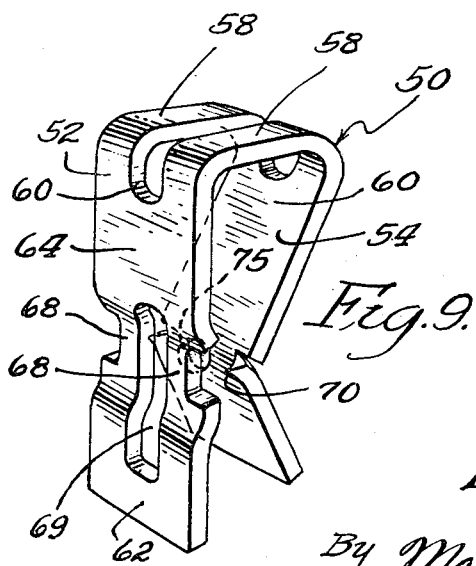
FIG. 9 is a perspective of the clip of FIG. 7.

With reference now to FIGS. 7, 8 and 9, a slightly modified form of the clip of the present invention is shown in detail. As in FIG. 1, a horseshoe shaped configuration is presented, the clip 50 having an inner leg 52 and an outer leg 54 joined by a saddle portion indicated generally at 56 and comprising a pair of spans 58 separated by a space defining a slot 60 which, in this instance, completely traverses the radii of the saddle portion.

The FIG. 7 form of the clip differs from those previously discussed in order to provide particular operative features. For example, it will be seen that the free end 62 of the inner leg 52, contrary to the FIG. 1 configuration, extends generally parallel with the bridge 64 instead of being flared out as in the clips previously discussed. This construction operates in concert with the wire retaining midsection or protuberance 66 of the inner leg which, in this instance, comprises a pair of offset ribs 68, which are separated by an elongated wire receiving slot 69 extending between the ribs from about the bridge towards the free end.

Furthermore, the ribs 68 are, themselves, flattened so as to be generally parallel with the plane of the bridge and free end. These modifications of the inner leg 52 provide, in accordance with the invention, excellent wire retaining properties. As seen in FIG. 8, the wire W is now secured not only between the ribs 68 which inhibits lateral movement, but is also engaged by a substantial area defined by the bridge as well as the free end. Accordingly, the gripping pressure which may be brought to bear on the wire is substantial.

Still another advantage attributable to the FIG. 7 configuration relates to the ease of mounting. Experimentation has shown that the FIG. 1 configuration characteristically tilts or cocks outwardly, favoring the outer leg having the barbed point 70. The "flatter" overall configuration of the present clip tends to go on the wall 72 of the outlet box straighter, thus making it more easily mounted, and mountable with greater confidence.

Still another change has been wrought by the decreasing of the radius r of the bends, and flattening the spans 58. This construction permits the clip to be mounted practically flush with the top of the box wall thereby permitting the clip or cover of the box to be fit tightly.

In the unstressed position shown in FIG. 7, the space between the tip of the barbs 70 and the plane of the inner leg and bridge is such that larger diameter wires are not readily threaded into the clip. In order, therefore, to facilitate this initial step, the outer leg is provided with an aperture or slot 75 disposed opposite the slot between the ribs 68 at the point which is nearest the inner leg. This provides additional space for threading of the wire and eliminates the need for prestressing the clip in order to thread the wire therethrough.

While the clip of FIGS. 7 and 8 may be assembled with the wire W in the fashion illustrated in FIG. 2, it is preferred, in order to take advantage of the flattened free end 62, to mount the wire as shown in FIG. 8. Thus, proper assembly includes the steps inserting the wire between the legs of the clip and out through the slot 60, and thereafter press the wire and clip assembly onto the wall 72. In this manner, the wire is firmly secured with a maximum electrical contact with the wall.

To facilitate mounting of the clips of this invention onto the wall of an electrical outlet box, it has been found to be advantageous to modify the foregoing structures. Such modifications include the provision of rounded corners on the free ends of the clips as opposed to square corners. This is much easier on the hands of the workman or electrician using the clips since sharp, cutting edges are obviated as well as easing mounting of the clip. Additionally, the inner leg may be tapered from about the lower portion of the bridge of the clip to the free end thereby allowing for ease of mounting the clip, as for instance, between the knock-out holes of an electrical outlet box. Still more importantly, a tool-engageable means may be provided on at least one of the legs of the clip to facilitate placement and securement onto the outlet box. This latter-named means may take the form of an upturned portion of the free end of either the inner or outer legs of the clip. Alternately, an upstanding projecting lug on either of the legs may suffice. In either case, the tool-engageable means will take, in the preferable form, a configuration to allow for engagement with the bit of a screwdriver or like tool.

To illustrate the foregoing embodiments which fall within the spirit and scope of the invention, reference is now made to FIGS. 10–14 inclusive. In this, one of the preferred embodiments, clip 80 has the basic horseshoe configuration as illustrated for the clip earlier described. Clip 80 is provided with an inner leg 82 and outer leg 84, being biased towards one another, and saddle portion indicated generally at 86 and comprising a pair of spans 88 separated by a space defining a slot 90.

This form of the clip is similar to that illustrated in FIGS. 7, 8 and 9 except as will become and as is apparent. Here the protuberance or ridge 92 of inner leg 82 is U-like in profile or cross-section. Inner leg 82 extends generally parallel with the bridge 94 and comprises a generally tapering configuration from about the lower portion of the bridge 94 to the free end 96. Inner leg 82 comprises spaced ribs 98 which are separated by elongated wire receiving slot 100 extending between the ribs from about the bridge towards the free end 96. It will be noted that inner leg 82 is provided with tool-engaging lug 102 which, in this instance and for reasons of economy, is formed integrally with the inner leg and fashioned from a portion of the material from the formation of slot 100. Lug 102 projects from the plane of the outer surface of leg 82 and is of an L-like configuration to provide a shoulder or abutment 104 which is engageable by the bit of a tool such as a screw driver. In practice, an electrician merely threads the wire, as previously disclosed, places the clip on the wall of the electrical box and pushes it thereonto by using his screw driver, the screw driver bit engaging the shoulder 104 of lug 102. The tapered end 96 facilitates this mounting technique. The rounded corners as at 106 and 108 of legs 82 and 84 respectively also provide an attribute as earlier discussed.

Outer leg 84 is provided with aperture or elongated slot 110 aligned with space 90 and positioned inward of barbs 112 and spaced from the free end of outer leg 84. These elements perform a function similar to that already described with respect to other embodiments of the invention. In the preferred mode of using the clips of this invention, the protuberance or ridge does not contact the wall of the outlet box, thereby allowing the full spring effect of the clip to bear on the wire. Obviously, the protuberance or ridge does bear against the box wall surface when the wire is threaded as illustrated in FIGS. 6 and 8.

The materials of construction in fabricating the clips of this invention may be any of those commonly used. The metal should be of the spring-steel type in order to obtain the clamping action sought after but metals other than steel are contemplated. Additionally, where the tool-engaging means is desired, the materials of construction should be of sufficient strength to permit the application of relatively high impact forces, as for instance, when the bit of a screw driver engages the lug and tapping forces are applied to drive the clip onto the electrical outlet box. The materials of construction may be finished, in order to improve electrical conductance, or unfinished as those of ordinary skill in the art will at once recognize.

Thus an improved clip has been disclosed which overcomes many of the shortcomings of prior art structures and which provides ease of mounting and securement, in an uncomplicated manner, which has heretofore been unavailable.

The embodiments in which an exclusive property or privilege is claimed are defined as follows:

1. For use in securing a wire in conductive contact with a wall of a housing, a clip comprising a strip of spring material formed into a resilient clamp engageable over an edge of the wall of the housing, said clip being defined by opposed inner and outer legs joined at adjacent ends thereof by a pair of parallel spans, having a space therebetween, said spans being resilient and formed to normally bias mutually opposed faces of said legs together, said inner leg being bent inwardly towards said outer leg to define a ridge near a free end of said inner leg, said ridge being parallel to said free end and engageable with the wall of the housing, a slot defined in said ridge, said slot being spaced from said free end and elongated in a direction transverse to said ridge and being constructed to secure a portion of the wire passing therethrough against sideways displacement, and means defining a bridge on said inner leg between said slot and said space to engage the wire and press the same against the wall.

2. The clip as set forth in claim 1 wherein the free end of said inner leg is flared outwardly from said outer leg.

3. The clip as set forth in claim 1 wherein the free end of said inner leg extends in a plane substantially parallel with said bridge, and the wire is positioned between said free end and the wall.

4. The clip as set forth in claim 1 wherein said slot is aligned with the space defined between said spans, and together therewith defines a wire confining path.

5. The clip as set forth in claim 4, wherein said wire passes through said slot, and an end thereof is passed between said spans, a flat portion of said inner leg between said slot and said space forming said bridge for engaging said wire and biasing the same against the wall of the housing.

6. The clip as set forth in claim 4 wherein the end of said inner leg is outwardly flared, and the wire is passed through said slot from between said flared end and the wall of the housing.

7. The clip as set forth in claim 4 wherein the length of said spans is at least as great as the combined thickness of the wall and the wire.

8. The clip as set forth in claim 7 wherein said outer legs are formed with inwardly projecting barbs, said barbs being engageable with the wall upon which said clip is mounted, said barbs acting as a fulcrum about which the position of said clip is adjustable to bring maximum pressure to bear on the wire held thereby.

9. For use in securing a wire in conductive contact with a wall of a housing, a clip comprising a strip of spring material formed into a resilient clamp engageable over an edge of the wall of the housing, said clip being defined by opposed inner and outer legs joined at adjacent ends thereof by a pair of parallel spans, having a space therebetween, said spans being resilient and formed to normally bias mutually opposed faces of said legs towards each other, said inner leg being bent inwardly towards said outer leg to define a protuberance near a free end of said inner leg, a slot defined in said protuberance, said slot being spaced from said free end and elongated in a direction transverse to said protuberance and being constructed to secure a portion of the wire passing therethrough against sideways displacement, and means defining a bridge on said inner leg between said slot and said space to engage the wire and press the same against the wall.

10. The clip in accordance with claim 9 wherein said outer leg is formed with inwardly projecting barbs, said barbs being engageable with the wall upon which said clip is mounted.

11. The clip in accordance with claim 10 wherein the free end of said outer leg is flared outwardly from said inner leg.

12. The clip in accordance with claim 11 wherein said slot is aligned with the spaced defined between said spans.

13. The clip in accordance with claim 12 wherein said inner leg is provided with a flat portion between said slot and said space to thereby form said bridge.

14. The clip in accordance with claim 13 wherein said protuberance is curvilinear in cross-section and the free end of said inner leg is flared outwardly from said outer leg.

15. The clip in accordance with claim 13 wherein said outer leg is provided with an elongated aperture spaced between said barbs in alignment with said space and spaced from the free end thereof.

16. The clip in accordance with claim 15 wherein said protuberance is of U-like configuration in cross-section and said free end of said inner leg extends in a plane substantially parallel with said bridge.

17. The clip in accordance with claim 16 wherein said free end of said inner leg has a tapering configuration.

18. The clip in accordance with claim 15 wherein tool-engageable means are provided on at least one of said free ends of said legs to facilitate placement of said clip on said wall.

19. The clip in accordance with claim 18 wherein said tool-engageable means comprises a projecting lug extending from the outer surface of said free end of said inner leg.

20. The clip in accordance with claim 19 wherein said lug is integral with said inner leg and is partially formed from the material of said clip removed to provide said slot.

References Cited

UNITED STATES PATENTS 2,997,685   8/1961   Anderson  ---------- 339—149
3,122,604   2/1964   Cook et al. ---------- 174—51

MARVIN A. CHAMPION, Primary Examiner

J. H. McGLYNN, Assistant Examiner

U.S. Cl. X.R.

339—256